July 13, 1943.   L. HAIFLEY ET AL   2,324,299
BRUSH RIGGING
Filed Oct. 14, 1942
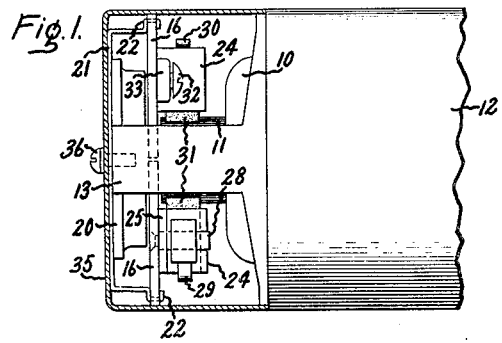
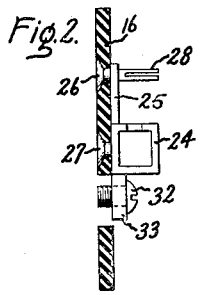
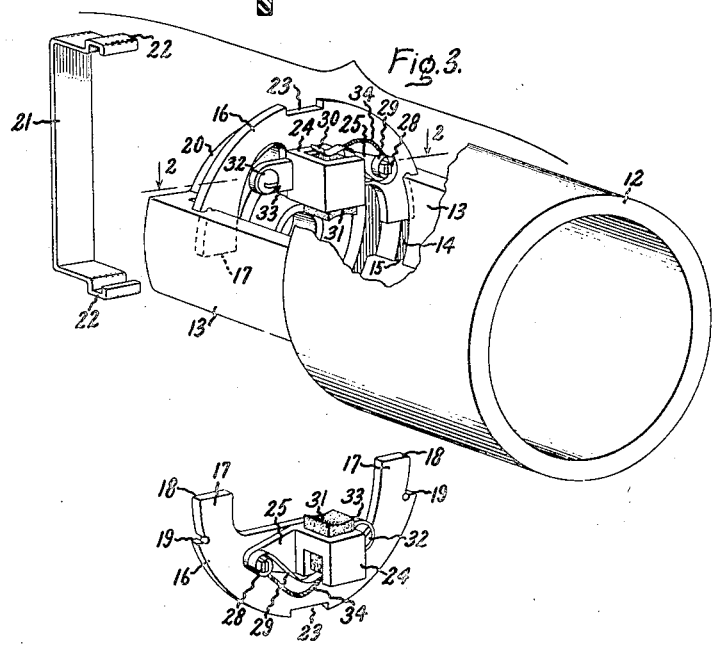
Inventors:
Leroy Haifley,
Lawrence F. Hemphill,
by Harry E. Dunham
Their Attorney.

Patented July 13, 1943

2,324,299

UNITED STATES PATENT OFFICE 2,324,299

BRUSH RIGGING

Leroy Haifley and Lawrence F. Hemphill, Fort Wayne, Ind., assignors to General Electric Company, a corporation of New York Application October 14, 1942, Serial No. 461,963

7 Claims. (Cl. 171—324)

Our invention relates to dynamo-electric machine brush rigging supporting structures and may also be used for supporting other parts of dynamo-electric machines.

An object of our invention is to provide an improved and simplified brush rigging for a dynamo-electric machine.

Another object of our invention is to provide an improved brush rigging supporting structure for a dynamo-electric machine.

A further object of our invention is to provide a supporting structure for a dynamo-electric machine member.

Further objects and advantages of our invention will be better understood from the following description referring to the accompanying drawing, and the features of novelty which characterize our invention will be pointed out with particularity in the claims annexed to and forming part of this specification.

In the drawing Fig. 1 is a partial side elevational view of a dynamo-electric machine, partly broken away to illustrate an embodiment of our invention; Fig. 2 is a sectional view of our improved brush rigging supporting structure, taken along line 2—2 of Fig. 3; and Fig. 3 is an exploded perspective view of the supporting structure shown in Fig. 1.

Referring to the drawing, we have shown a dynamo-electric machine provided with a rotatable member or armature 10 having a suitable winding connected to a commutator 11 and arranged within a stationary member 12. The stationary member is provided with a frame 12 to which an armature bearing supporting frame is secured which is provided with two axially extending arms 13 which are adapted to support a brush rigging associated with the commutator 11. The pair of arms 13 is formed with an arcuate circumferentially extending groove 14 adjacent the end of each arm, and these grooves are arranged diametrically opposite each other such that the outer ends 15 of these grooves are on a shorter chord than other points thereof. Thus, the distance between the centers of these grooves is greater than the distance between adjacent corresponding ends of the grooves. The brush rigging is provided with a supporting structure which includes arcuate supporting members 16 formed of a slightly flexible insulating material and provided with arcuate end portions 17 formed with an outer curvature complementary to the grooves 14. Certain corresponding points on opposite arcuate portions, such as the outer ends 18 of the arcuate portions 17, are formed on a longer chord than the outer ends 15 of the grooves 14, as the distance between the outer ends 18 corresponds to the distance between the centers of the grooves 14. In order to place the supporting member 16 with the arcuate section 17 within the grooves 14, it is necessary to bend or snap the member 16 slightly to provide for the insertion of the ends 18 within the ends 15 of the grooves 14. With such a construction the supporting member is held against accidental displacement from the grooves 14 in the supporting arms 13 as the member 16 cannot be withdrawn from the grooves 14 without flexing it to bring the ends 18 of the member toward each other a distance less than the chord between the ends 15 of the arcuate grooves 14. Furthermore, since chords between corresponding points in the grooves 14 on either side of the center thereof are less than a chord between the central points of the grooves, the supporting members 16 will tend to remain in a centered position within the grooves. However, in order to assure further against the displacement of the supporting member 16, projections 19 are formed adjacent the ends of the arcuate portions 17 for limiting the insertion of the supporting member into the grooves. A pair of these supporting structures is arranged in diametrically opposed positions in the grooves 14, and a bearing supporting end plate 20 is formed integral with the ends of the arms 13. This plate 20 also is used to prevent chattering of the supporting structure, and a resilient spring 21 is arranged across the outer side of the plate 20 and is formed with a clamping section 22 adjacent each end thereof arranged in engagement with a slot 23 formed in the outer central portion of each of the supporting structures 16 and thereby rigidly secures the supporting structures 16 in position within the slots 14 and prevents axial chattering of the supporting structure by its pressure against the plate 20.

In order to support a current contact brush by the brush rigging, a substantially rectangular brush holder guiding element 24 is secured to each of the supporting members 16 by a plate 25 fastened to the supporting structure 16 by a pair of rivets 26 and 27. The rivet 26 is formed with a bifurcated end 28 which projects beyond the plate 25 and in which an end of a brush biasing spring 29 is adapted to be secured. This brush biasing spring is provided with a contact end 30 arranged to engage a suitable contact brush 31 within the brush holder guide 24. The electrical connections to the brush holder from a source of electrical power supply can be made by securing a lead to a screw 32 which threadedly engages a finger 33 formed integral with the plate 25 and the brush holder 24. In order to prevent overheating of the biasing spring 29, a pigtail 34 also is secured to the end 28 of the rivet 26 and to the contact brush 31 and is adapted to minimize the electric current carried by the biasing spring 29. This entire brush rigging is enclosed by an end cover 35 arranged over the arms 13 of bearing end frame in order to exclude foreign substances from the interior of the motor and is secured to the frame plate 20 by screws 36 which threadedly engage openings in the arms 13.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A dynamo-electric machine member supporting structure including a pair of mounting elements having arcuate grooves therein with the outer ends of the pair of grooves formed on a shorter chord than other points thereon, and a slightly flexible supporting member having arcuate end portions arranged in engagement with said grooves and constructed complementary to a portion of said arcuate grooves with the outer ends of said arcuate end portions formed on a longer chord than the chord between the outer ends of said grooves.

2. A dynamo-electric machine member supporting structure including a mounting element having a pair of arcuate grooves therein with the outer ends of the pair of grooves formed on a shorter chord than other points thereon, and a slightly flexible supporting member having arcuate portions arranged in engagement with said grooves and constructed complementary to a portion of said arcuate grooves with certain corresponding points of said arcuate portions formed on a longer chord than the chord between the outer ends of said grooves.

3. A brush rigging including a pair of mounting elements having arcuate grooves therein with the outer ends of the pair of grooves formed on a shorter chord than other points thereon, a slightly flexible supporting member having arcuate end portions arranged in engagement with said grooves and constructed complementary to a portion of said arcuate grooves with the outer ends of said arcuate end portions formed on a longer chord than the chord between the outer ends of said grooves, and a brush holder secured to said supporting member.

4. A dynamo-electric machine brush rigging including a stationary member frame having a pair of arcuate grooves in opposite sides thereof with the outer ends of the pair of grooves formed on a shorter chord than other points thereon, a slightly flexible supporting member having arcuate end portions arranged in said grooves and constructed complementary to a portion of said arcuate grooves with the outer ends of said arcuate end portions formed on a longer chord than the chord between the outer ends of said grooves, and a brush holder secured to said supporting member.

5. A dynamo-electric machine brush rigging including a stationary member frame having a pair of arcuate grooves in opposite sides thereof with the outer ends of the pair of grooves formed on a shorter chord than other points thereon, a slightly flexible supporting member having arcuate end portions arranged in engagement with said grooves and constructed complementary to a portion of said arcuate grooves with the outer ends of said arcuate end portions formed on a longer chord than the chord between the outer ends of said grooves, said supporting member having projections adjacent the ends of said complementary arcuate portions for limiting the insertion of said supporting member into said grooves, and a brush holder secured to said supporting member.

6. A dynamo-electric machine brush rigging including a stationary member frame having a pair of arcuate grooves in opposite sides thereof with the outer ends of the pair of grooves formed on a shorter chord than other points thereon, a slightly flexible supporting member having arcuate end portions arranged in engagement with said grooves and constructed complementary to a portion of said arcuate grooves with the outer ends of said arcuate end portions formed on a longer chord than the chord between the outer ends of said grooves, a stiffening plate secured to said frame, and means including a retaining element for connecting said supporting member to said stiffening plate for preventing accidental removal of said supporting member from said grooves.

7. A dynamo-electric machine brush rigging including a stationary member frame having a pair of arcuate grooves in opposite sides thereof with the outer ends of the pair of grooves formed on a shorter chord than other points thereon, a slightly flexible supporting member having arcuate end portions arranged in engagement with said grooves and constructed complementary to a portion of said arcuate grooves with the outer ends of said arcuate end portions formed on a longer chord than the chord between the outer ends of said grooves, a stiffening plate secured to said frame, means including a resilient retaining element for biasing said supporting member into said grooves, and a brush holder secured to said supporting member.

LEROY HAIFLEY.
LAWRENCE F. HEMPHILL.